United States Patent [19]

Ando et al.

[11] Patent Number: 4,458,106

[45] Date of Patent: Jul. 3, 1984

[54] SUPER CONDUCTIVE WIRE

[75] Inventors: Toshinari Ando; Masataka Nishi; Yoshikayu Takahashi; Susumu Shimamoto; all of Tokaimura, Japan

[73] Assignee: Japan Atomic Energy Research Institute, Tokyo, Japan

[21] Appl. No.: 436,700

[22] Filed: Oct. 26, 1982

[30] Foreign Application Priority Data

Nov. 2, 1981 [JP] Japan ................................. 56-174432

[51] Int. Cl.³ .............................................. H01B 12/00
[52] U.S. Cl. ................................. 174/126 S; 174/15 S
[58] Field of Search ................ 174/15 S, 126 S, 128 S

[56] References Cited

U.S. PATENT DOCUMENTS 3,662,093  5/1972  Wilson et al. .................... 174/128 S
3,767,842  10/1973  Bronca et al. .................... 174/128 S
4,101,731  7/1978  Marancik .......................... 174/126 S
4,384,168  5/1983  Kenney ............................. 174/126 S

FOREIGN PATENT DOCUMENTS 2329861  1/1974  Fed. Rep. of Germany ... 174/126 S
46-00696  1/1971  Japan ................................. 174/126 S Primary Examiner—J. V. Truhe
Assistant Examiner—Morris H. Nimmo
Attorney, Agent, or Firm—Schwartz & Weinrieb

[57] ABSTRACT

A super-conductive wire includes a plurality of super-conductive filaments embedded within a metal matrix. A heat shield layer is circumferentially disposed about the matrix so as to prevent the ingress of diffusion of heat into the matrix from the exterior of the wire, and a plurality of longitudinally extending grooves are defined within the surface portion of the wire to such a radial depth as to penetrate the heat shield layer and therefore permit the matrix of the wire to be in direct thermal contact with a coolant disposed about the exterior of the wire so as to permit heat within the matrix to be discharged therefrom to the exteriorly disposed coolant.

5 Claims, 3 Drawing Figures

SUPER CONDUCTIVE WIRE

FIELD OF THE INVENTION

The present invention relates to a super (electrically) conductive wire. More particularly, the present invention relates to a super conductive wire having improved stabilization.

BACKGROUND OF THE INVENTION

In general, a super conductive wire is composed of a super conductive material such as Ni-Ti, $Nb_3Sn$, and the like, and a stabilizing material such as copper, aluminum, and the like. The super conductive wire is wound in the form of a coil to produce a magnetic field and is used as an electromagnet for a nuclear fusion reactor and an accelerator in high physical science. However, it has been well known that the super conductive wire deteriorates in its operational characteristics, as shown in FIG. 1, when it is made into a coil. The cause thereof can be classified into two large groups. The one is a heat evolution due to a disturbance (internal disturbance) raised in the interior of the super conductor and the other is the fact that a heat evolution (external disturbance) due to friction among the super conductive wires in a coil becomes higher than the critical temperature of the super conductor to bring about a transition of from super conductive state to normal conductive state. The former has been solved by making the super conductive material have a small diameter, but the latter has not yet been solved.

OBJECTS OF THE INVENTION

An object of the present invention is to provide a super conductive wire which effectively removes such external disturbance and provides more improved stabilization.

SUMMARY OF THE INVENTION

As a result of conducting diligent research, the present inventors have accomplished the object by cutting a plurality of grooves longitudinally on the surface of the super conductive wire and providing a layer circumferentially about the wire matrix for preventing heat diffusion into the matrix, the grooves extending to a radial depth sufficient to penetrate the heat diffusion preventive layer and thereby provide direct cooling paths for the matrix to the exterior of the wire to permit heat to escape the wire matrix.

BRIEF DESCRIPTION OF THE DRAWING

Various other objects, features, and attendant advantages of the present invention will be more fully appreciated as the same becomes better understood from the following detailed description when considered in connection with the accompanying drawings, in which like reference characters designate like or corresponding parts throughout the several views, and wherein.

DESCRIPTION OF THE PREFERRED EMBODIMENT

Figure 1:
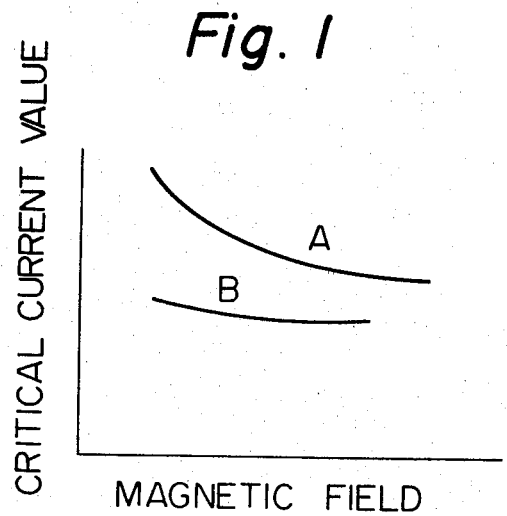
FIG. 1 is a graph showing the relationship between the magnetic field and critical current value in the case of a non-coiled super conductive wire (A) and in the case of a coiled super conductive wire (B)
Figure 2:
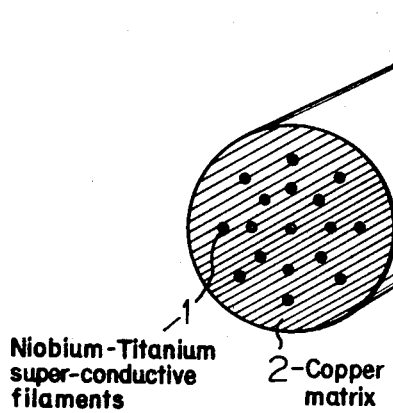
FIG. 2 is a cross-sectional view of a prior art super conductive wire.
Figure 3:
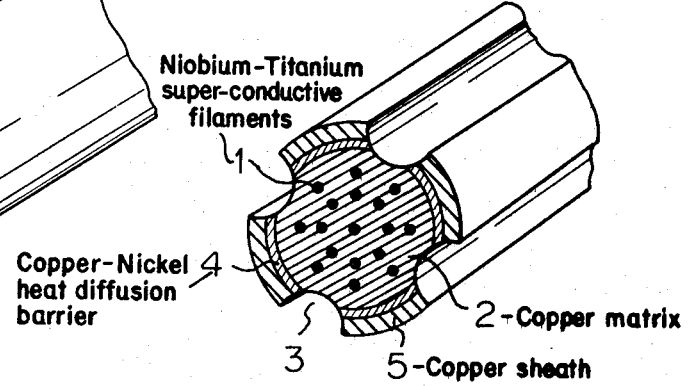
FIG. 3 shows diagramatically an embodiment of a super conductive wire of the present invention.

Referring now to the drawings, and more particularly to FIG. 3 thereof, there is shown the new and improved super-conductive wire constructed in accordance with the present invention wherein the super-conductive wire comprises a plurality of super-conductive filaments 1 disposed within a copper metal matrix 2. A heat shield layer 4, made of, for example, a copper-nickel alloy, is circumferentially disposed about the copper metal matrix 2 so as to prevent the diffusion of heat into the wire as a result, for example, of heat generated at the surface of the super-conductive wire due to friction developed between adjacent super-conductive wires. In accordance with a particularly unique feature of the present invention, longitudinally or axially extending grooves 3 are defined within the surface of the super-conductive wire such that the radial extent or depth of the grooves is sufficient to penetrate the heat shield layer 4. In this manner, a refrigerant or coolant medium, not shown, within which the super-conductive wire is disposed, is able to be in direct contact with the super-conductive wire matrix 2 by means of the grooves 3 whereby heat developed internally within the super-conductive wire is able to be discharged therefrom. The coolant or refrigerant may be, for example, helium. The super-conductive wire also comprises a copper sheath 5 circumferentially disposed about the heat shield layer 4, the grooves 3 of course penetrating both heat shield layer 4 and copper sheath 5.

For manufacturing such super conductive wire, a copper basic material containing numerous Nb-Ti filaments is covered with a Cu-Ni alloy of pipe and is further covered with a copper pipe thereon, and after wire drawing, the surface is cut processed.

The super conductive wire so manufactured in accordance with the present invention removes the deterioration phenomena caused by external disturbances and has the effect of remarkably elevating a stable operation of super conductive coils.

The super conductive wire of the present invention can be used as a yarn stock for intertwining plural wires to compose a super conductor.

Obviously, many modifications and variations of the present invention are possible in light of the above teachings. It is therefore to be appreciated that within the scope of the appended claims, the present invention may be practiced otherwise than as specifically described herein.

What is claimed is:
1. A super-conductive wire, comprising:
a metal matrix;
a plurality of super-conductive filaments disposed within said metal matrix;
a heat shield layer disposed about said matrix for preventing the diffusion of heat into said matrix from the exterior surface of said super-conductive wire; and
longitudinally extending grooves defined within the surface of said super-conductive wire and having sufficient radial depth so as to penetrate said heat shield layer and extend into said metal matrix for permitting heat from said matrix to be discharged exteriorly of said super-conductive wire.
2. A super-conductive wire as set forth in claim 1, wherein:
said metal matrix comprises copper.

3. A super-conductive wire as set forth in claim 1, wherein:
   said super-conductive filaments are fabricated of a niobium-titanium alloy.

4. A super-conductive wire as set forth in claim 1, wherein:
   said heat shield layer is fabricated from a copper-nickel alloy.

5. A super-conductive wire as set forth in claim 1, wherein:
   four longitudinally extending grooves are disposed at equiangular locations about said super-conductive wire.

* * * * *